(12) United States Patent
Chan et al.

(10) Patent No.: US 7,447,781 B2
(45) Date of Patent: Nov. 4, 2008

(54) METHOD FOR MANAGING COMMERCE CONTEXTS

(75) Inventors: Victor S. Chan, Thornhill (CA); Robert M. H. Dunn, Toronto (CA); Madeline K. Y. Fok, Toronto (CA); Raymond K. M. Kwok, Willowdale (CA); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 10/732,751

(22) Filed: Dec. 10, 2003

(65) Prior Publication Data

US 2004/0260757 A1 Dec. 23, 2004

(30) Foreign Application Priority Data

Jun. 17, 2003 (CA) .................................. 2432616

(51) Int. Cl.
G06F 15/16 (2006.01)
(52) U.S. Cl. ................. 709/228; 709/203; 709/212; 709/217; 709/219; 709/226; 709/229
(58) Field of Classification Search ................. 709/203, 709/217, 223, 212, 219, 228, 229, 226; 705/26, 705/27
See application file for complete search history.

(56) References Cited

U.S. PATENT DOCUMENTS

| 6,055,513 | A * | 4/2000 | Katz et al. ................. 705/26 |
| 6,170,017 | B1 * | 1/2001 | Dias et al. ................. 709/235 |
| 6,199,099 | B1 * | 3/2001 | Gershman et al. .......... 709/203 |
| 6,223,215 | B1 * | 4/2001 | Hunt et al. ................. 709/217 |
| 7,013,289 | B2 * | 3/2006 | Horn et al. ................. 705/26 |
| 2002/0032590 | A1 | 3/2002 | Anand et al. ................. 705/7 |
| 2002/0038255 | A1 * | 3/2002 | Tarvydas et al. ............. 705/26 |
| 2002/0046240 | A1 | 4/2002 | Graham et al. ............. 709/203 |
| 2002/0099796 | A1 * | 7/2002 | Chou ......................... 709/219 |
| 2002/0109734 | A1 | 8/2002 | Umezu et al. ............. 345/846 |
| 2002/0158916 | A1 | 10/2002 | Gusler et al. ............. 345/850 |
| 2002/0194087 | A1 * | 12/2002 | Spiegel et al. ............. 705/26 |
| 2003/0061387 | A1 * | 3/2003 | Brown et al. ............. 709/246 |
| 2003/0088617 | A1 * | 5/2003 | Clark et al. ............. 709/203 |

FOREIGN PATENT DOCUMENTS

| CA | 2332973 | 12/1999 |
| WO | WO01/71617 | 3/2001 |

OTHER PUBLICATIONS

E. Althammer et al. "Design and Implementation of an MVC-Based Architecture for E-Commerce Applications," *International Journal of Computers and Applications*, vol. 23, No. 3, 2001, pp. 173-185.
Kara Warburton. "A Database of E-commerce Terms: Implementation and Benefits in Producing Internationalized Software," pp. 120-126.
D. Ford et al. "Automated Purchasing System and Method,", Pending.

* cited by examiner

*Primary Examiner*—Michael Won
(74) *Attorney, Agent, or Firm*—Joseph Bracken; Winstead, P.C.

(57) ABSTRACT

A method for managing commerce contexts between a direct commerce context and a temporary commerce context in a client session. Commerce context parameters are associated with the direct and temporary commerce contexts. The commerce context associated with a client request is determined according to the commerce context parameters associated with the client request.

5 Claims, 11 Drawing Sheets

METHOD FOR MANAGING COMMERCE CONTEXTS

CROSS REFERENCE TO RELATED APPLICATIONS

This Application claims priority under 35 U.S.C. §119(a) to Canadian Patent Application No. 2,432,616, filed Jun. 17, 2003, which is hereby incorporated herein by reference in its entirety.

TECHNICAL FIELD

The present invention relates to data processing systems, and more particularly to a context switch and a process for managing commerce contexts in client sessions.

BACKGROUND INFORMATION

Modern Internet and web applications commonly require information about the user and user's activities to be maintained across multiple requests. For example, in a typical online store, the user is provided with a browseable catalog from which items can be selected and added to a shopping cart. Once the user has added all the desired items to the shopping cart, the user may proceed to the checkout where an order for the items contained in the shopping cart may be placed. To accomplish this process, multiple client requests are required and the information from each request must be maintained across requests.

A hypertext transfer protocol (HTTP) is used to access many resources on the Internet. However, HTTP is a stateless protocol that defines the format of requests and corresponding responses but does not currently define a mechanism for maintaining state information. In a typical request, an HTTP user or client opens a connection with a server and requests some information or a resource. The server responds with the requested resource, if available, or an HTTP error status page. After the server's response, the connection is closed and the server does not maintain any information about the client. Any subsequent request by the client is considered a fresh request with no relation to the previous request.

Several approaches have been developed to maintain user information across requests and responses. These approaches use the notions of sessions and states. A session is a series of HTTP requests originating from the same client in the same browser instance or "working session." State refers to information relating to the previous requests and other business decisions that may be made in relation to these requests. Utilizing these approaches, an Internet or web application should be able to associate a state with each session. Two common methods of session management are cookies and Universal Resource Locator (URL) rewriting. Cookies and URL rewriting are known in the art. Other session management strategies are also known in the art. Generally, session management strategies use an associated session area to store information about the user session.

Many modern Internet and web applications are modular in design. Modularity allows different aspects of an application to be developed independently from one another. The Model-View-Controller (MVC) design pattern is a common design paradigm used in developing modular applications. The MVC design pattern is known in the art.

In many Internet and web applications, a user will typically have to navigate through a number of organizations. These organizations may be located in different domains. For example, in an electronic marketplace or e-marketplace environment, a buyer in a supply channel may move between a manufacturer or supplier and distributors or resellers. Each of these organizations is referred to as a store. Each store will typically have its own commerce context, for example, a store context. Thus, when navigating between stores, it is necessary to manage the switch between store contexts. A simple shopping flow illustrates this problem.

A typical shopping scenario for a supply channel may involve the following steps:
(1) A buyer visits the channel store main page;
(2) Browses through the catalog;
(3) Places an order for a product;
(4) Receives a confirmation for the order;
(5) Continues browsing for other products.

The process steps described above may be given the following names:
Step (1)—StoreFrontDisplay
Step (2)—ProductDisplay
Step (3)—OrderProcess
Step (4)—OrderDisplay
Step (5)—ProductDisplay In this shopping scenario, the buyer moves back and forth between the channel and a supplier store. In step (1), the StoreFrontDisplay displays the main page of the channel store. In step (2), ProductDisplay involves retrieving the product(s) from the catalog of the channel store and rendering the product description(s). In step (3), OrderProcess involves placing the order in the supplier store. In step (4), OrderDisplay retrieves the order and displays the order. This step can be performed in the channel store or the supplier store. In step (5) ProductDisplay, the buyer is in channel store browsing products from the catalog.

To create a smooth shopping experience, there needs to be a way to manage the switch between these store contexts. Several methods of managing store contexts are known in the art. One method involves creating a store identifier or store ID for each store, and appending the store ID as a parameter in each of the URLs that are called. The URLs would look something like this for the process steps described above:
Step (1) . . . /StoreFrontDisplay?StoreID=c_store1
Step (2) /ProductDisplay?StoreID=c_store1&ProductID= . . .
Step (3) . . . /OrderProcess?StoreID=s_store2 . . . .
Step (4) . . . /OrderDisplay?StoreID=s_store2
Step (5) /ProductDisplay?StoreID=c_store1&ProductID= . . .

where c_store1 is the store ID for the channel store and s_store2 is the store ID for the supplier store.

A disadvantage of this approach is that it requires web designers to hard code the store ID into URLs used in the Internet or web application. This additional complexity further complicates modular application design. For example, hard coding URLs in an MVC application may affect the design of each of the model, view, and controller components.

In view of these shortcomings, there exists a need for another method of managing commerce contexts.

SUMMARY OF THE INVENTION

The present invention provides a method for managing commerce contexts using direct and temporary commerce context parameters.

In accordance with one aspect of the present invention, there is provided for a data processing system, a method for managing commerce contexts, the data processing system being associated with a direct commerce context and a temporary commerce context, the data processing system being operatively coupled to memory having a session area, the method comprising the steps of receiving a client request associated with a commerce context parameter, and determining the commerce context associated with the commerce context parameter.

In accordance with another aspect of the present invention, there is provided a computer program product having computer-readable medium tangibly embodying code for directing a data processing system to manage commerce contexts, the data processing system being associated with a direct commerce context and a temporary commerce context, the data processing system being operatively coupled to memory having a session area, the computer program product comprising code for receiving a client request associated with a commerce context parameter, and code for determining the commerce context associated with the commerce context parameter.

In accordance with a further aspect of the present invention, there is provided a data processing system for managing commerce contexts, the data processing system being associated with a direct commerce context and a temporary commerce context, the data processing system being operatively coupled to memory having a session area, the data processing system comprising means for receiving a client request associated with a commerce context parameter, and means for determining the commerce context associated with the commerce context parameter.

In accordance with yet a further aspect of the present invention, there is provided a computer data signal embodied in a carrier wave and having means in the computer data signal for directing a data processing system to manage commerce contexts, the data processing system being associated with a direct commerce context and a temporary commerce context, the data processing system being operatively coupled to memory having a session area, the computer data signal comprising a component in the computer data signal for receiving a client request associated with a commerce context parameter, and a component in the computer data signal for determining the commerce context associated with the commerce context parameter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

DETAILED DESCRIPTION OF THE EMBODIMENTS

The following detailed description of specific embodiments of the present invention does not limit the implementation of the invention to any particular computer programming language. The present invention may be implemented in any computer programming language provided that the operating system provides the facilities to support the requirements of the present invention. In one embodiment, the present invention is implemented, at least partly, in the Java computer programming language. Any limitations presented herein as a result of a particular type of operating system or computer programming language are not intended as limitations of the present invention.

Figure 1:
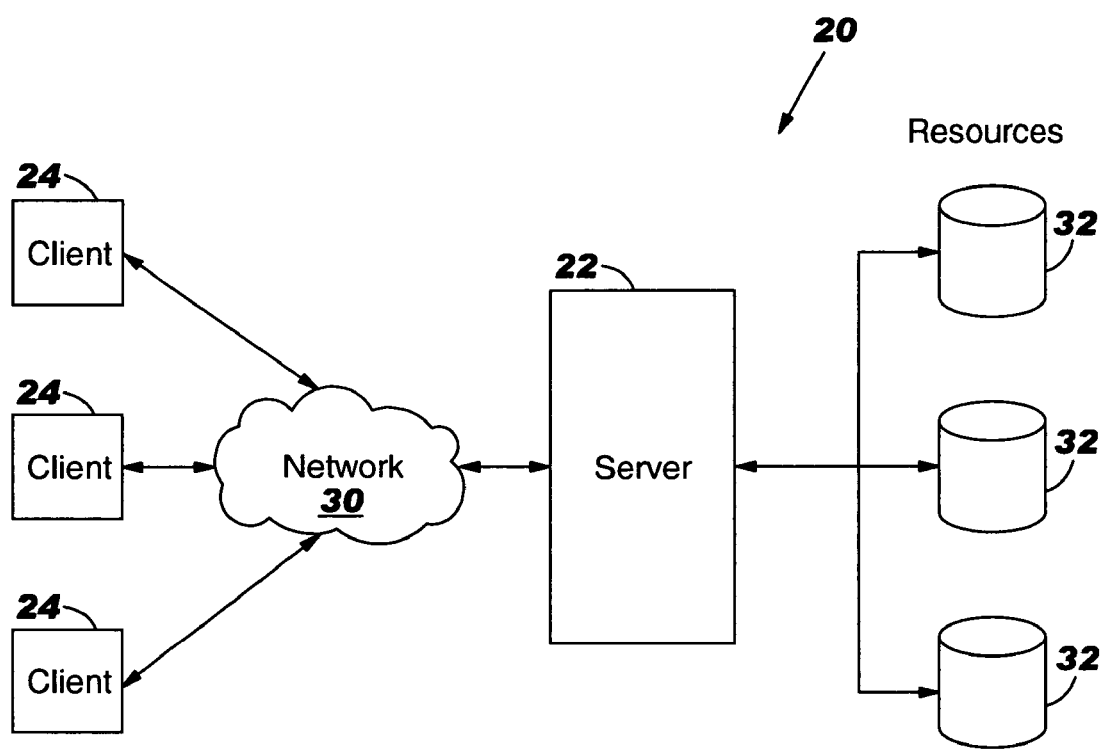
FIG. 1 is a schematic diagram of a computer system suitable for practicing the invention.

Reference is first made to FIG. 1, which shows a computer system 20 upon which the present invention is implemented. The computer system 20 includes a server 22 and clients 24 which are interconnected by a network 30. The server 22 may be modeled as a number of server components including an application or business logic server, web server, graphical user interface server, and a database server or resource manager. The clients 24 include computers, data processing systems, handheld portable devices, or computer networks. The clients 24 may be the same or different. In one embodiment, the network 30 is the Internet or World Wide Web (WWW). In such cases, the client devices are equipped with appropriate web browser software such as Internet Explorer™ from Microsoft Corporation or Netscape's Navigator™, and the application servers are equipped with appropriate HTTP server software, such as the WebSphere™ product from IBM.

The computer system 20 further includes resources 32 connected to the network 30. The resources 32 include storage media, databases, for example, a relational database such as the DB2™ product from IBM, a set of XML (extensible Markup Language) documents, a directory service such as a LDAP (Lightweight Directory Access Protocol) server, and backend systems. The interface between the server 22 and the resources 32 comprises a local area network, Internet, or a proprietary interface. The resources 32 are accessed by the server 22 and the clients 24. Any of the server 22, the clients 24, and the resources 32 may be located remotely from one another or may share a location. The configuration of the computer system 20 is not intended as a limitation of the present invention, as will be understood by those of ordinary skill in the art from a review of the following detailed description.

Figure 2:
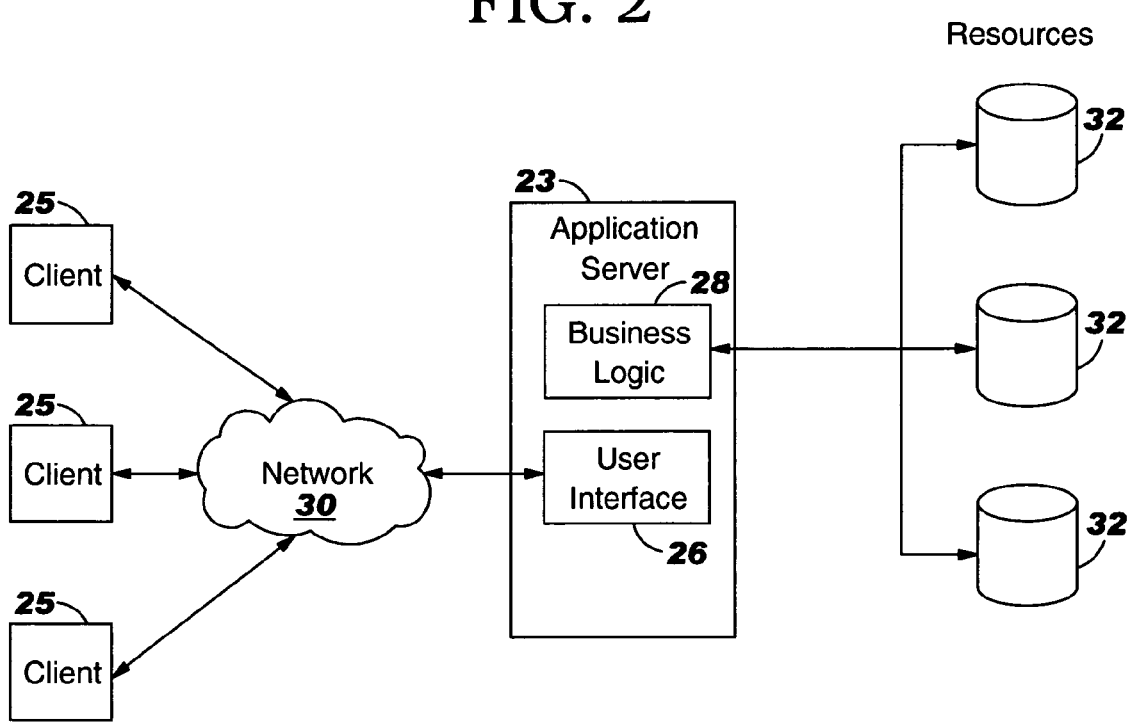
FIG. 2 is a schematic diagram of a server for the computer system of FIG. 1 and which is connected to the computer system.

Referring now to FIG. 2, a server in the computer system 20 will be described in more detail. The server 23 comprises a web application server compliant with the Java Version 2 Enterprise Edition (J2EE) platform such as the WebSphere™ product from IBM. A client 25 connects to the server 23 via the Internet or WWW. A user interface 26 is presented to the client 25, using JavaServer Pages (JSPs) and servlets. Using JSP technology makes it easy for user interface developers to present dynamically generated pages to any client equipped with an Internet browser. Servlets give more sophisticated developers of Java-based applications the ability to implement dynamic presentations completely in the Java programming language. A business logic module 28 is implemented on the server 23 using Enterprise JavaBean components (EJB) for the object layer. WebSphere™ and other J2EE-compliant application servers provide an organization that allows user interface functions to be separated from the business logic module 28 on the application server 23. Those skilled in the art will recognize that many computing platforms, operating systems, and enterprise application server suites may be used with the present invention without departing from the scope of the invention.

Figure 3:
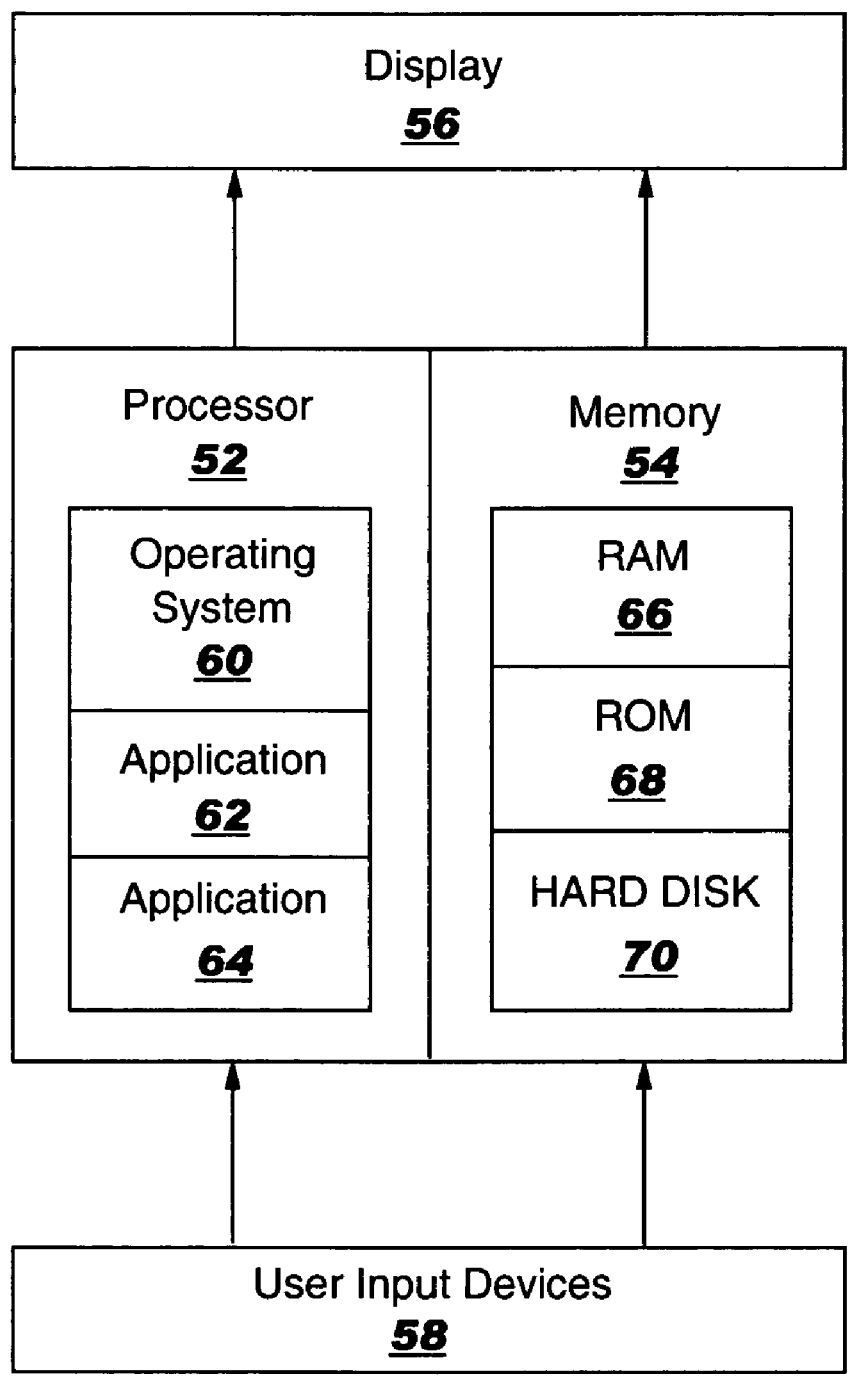
FIG. 3 is a block diagram of a data processing for the computer system of FIG. 1.

Referring now to FIG. 3, a data processing system 50 in the computer system 20 is now described in more detail. The data processing system 50 includes a processor 52, a memory 54, a display 56, and user input devices 58 such as a keyboard and a pointing device (e.g. mouse), and a communication interface (not shown) for communicating with the network 30 (FIG. 2). An operating system 60 and application programs 62, 64 run on the processor 52. The memory 54 includes random access memory ("RAM") 66, read only memory ("ROM") 68, and hard disk 70. The data processing system 50 may be a client or a server.

Figure 4:
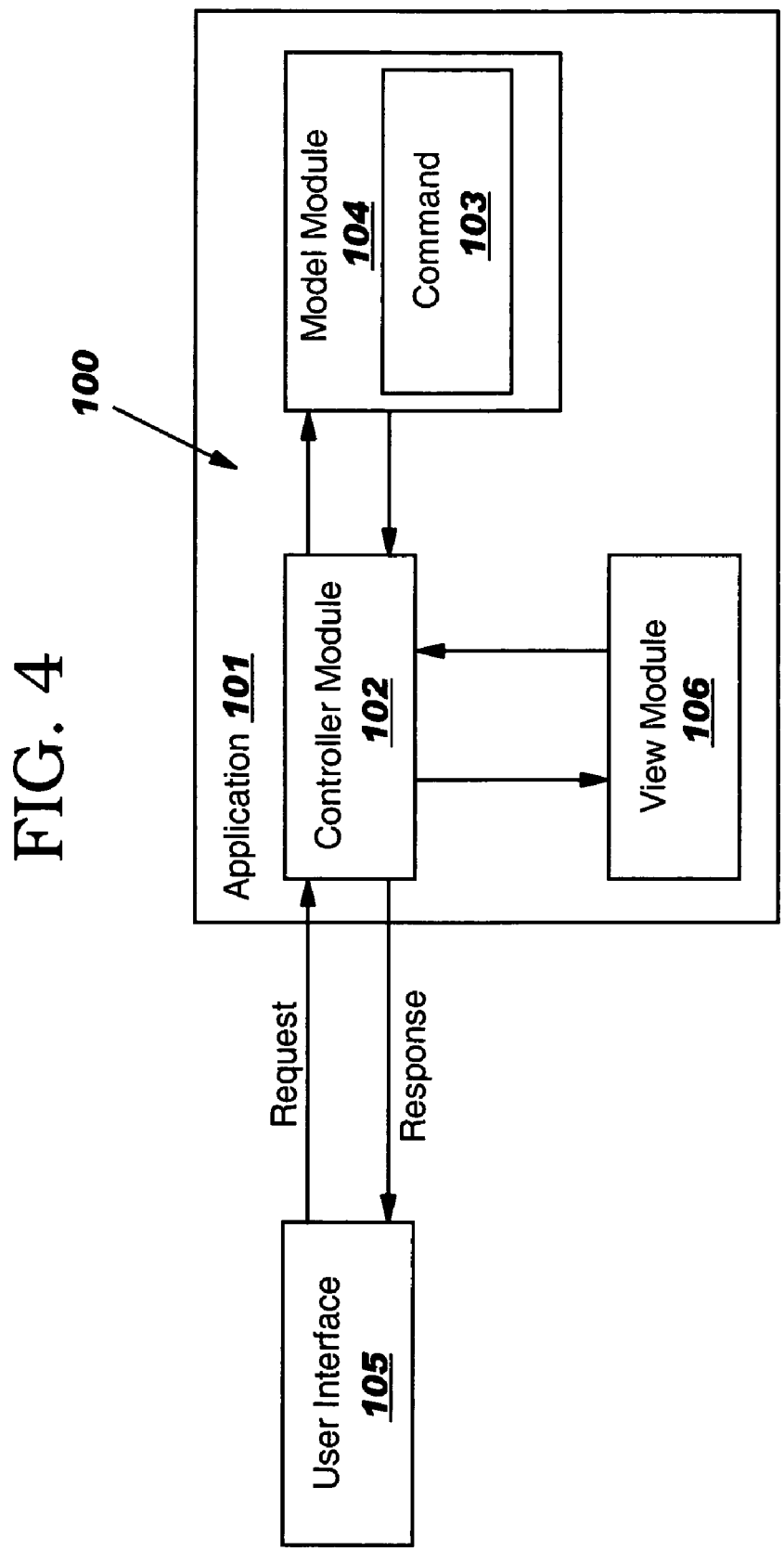
FIG. 4 is a block diagram of one embodiment of a commerce context switch implemented according to the present invention.

Reference is now made to FIG. 4, which shows in a block diagram form an implementation for a commerce context switch 100 according to the present invention. The commerce context switch 100 is implemented in functional modules in the form of computer software or a computer program product and executed by the processor 52 (FIG. 3) during operation of the computer program product. The commerce context switch 100 is implemented in an application 101 and comprises a controller module 102, a model module 104, and a view module 106. A user interface 105 allows a user to communicate with the controller module 102. The model module 104 is implemented using a Command pattern 103 that operates on Enterprise Java Beans.

The application 101 uses the MVC (Module-View-Controller) design pattern to handle client requests and responses. The controller module 102 determines which operation to perform and the proper execution context for each request based on the request parameters and session information and data. This execution context is referred to as a command context. The command context is passed to the model 104 and the view 106 modules.

Referring still to FIG. 4, the controller module 102 communicates with the user interface 105 by interpreting requests and handling responses. The model module 104 contains business logic operations and commands, and accesses data and other resources. The view module 106 handles the presentation of information and data. In the operation of a web application, the controller module 102 interprets incoming HTTP requests and invokes the requested business logic operation or command in the model module 104. Upon completion of the business logic operation, the controller module 102 updates the view module 106. The controller module 102 selects the next view to display based on the present data and result of the operation of the business logic 28 (FIG. 2). The controller module 102 then transmits the view to the user interface 105.

Some embodiments of the present invention may be implemented in a different application framework from that described below. The application framework defines, at least in part, the order of events and operations performed by the application. In one embodiment, the application framework may allow the client request to contain information regarding the view to be invoked following the execution of a command or business logic operation. In this case, following the execution of the command, the controller module 102 invokes the next view to be displayed based on the information in the client request.

Figure 5:
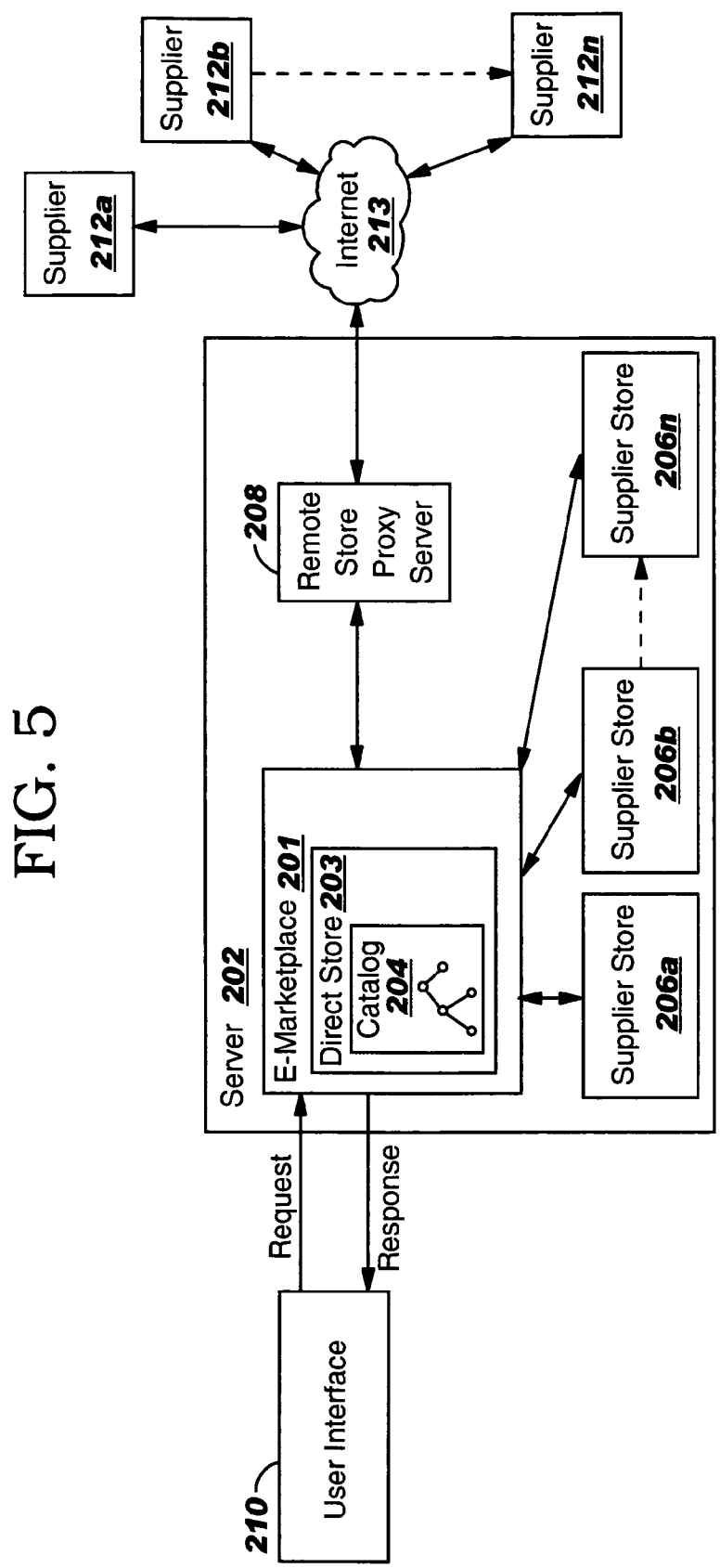
FIG. 5 is a schematic diagram of an electronic marketplace in which the present invention may be implemented.

Reference is now made to FIG. 5, which shows an implementation of an electronic marketplace in which the present invention is operated. An e-marketplace place is an electronic forum that brings multiple buyers and sellers together in a way that provides efficient electronic trading of goods and services. An electronic marketplace or e-marketplace 201 is implemented on a server 202. The e-marketplace environment may be provided by a web application such as the WebSphere™ Commerce product from IBM. The e-marketplace 201 includes a direct store 203 having a catalog 204 and hosted supplier stores 206, indicated individually by references 206a, 206b, . . . 206n. Stores hosted in this manner typically have a hosted storefront served using the IT infrastructure of the direct or channel store 203 in the e-marketplace 201. The e-marketplace 201 may also be operably connected to a remote supplier store proxy server 208. The proxy server 208 is implemented on a separate server or on the server 202. A user interface 210 permits a client to connect with the server 202 and the e-marketplace 201. The user interface 210 provides an Internet or web browser with which a client can navigate the e-marketplace 201. Non-hosted remote supplier stores 212, indicated individually by references 212a, 212b, . . . 212n, may connect to the e-marketplace 201 and the server 202 over the Internet 213 via the proxy server 208. Typically, the hosted stores 206 are in the same domain as the channel store 203 and the non-hosted stores 212 are in a different domain.

Figure 6:
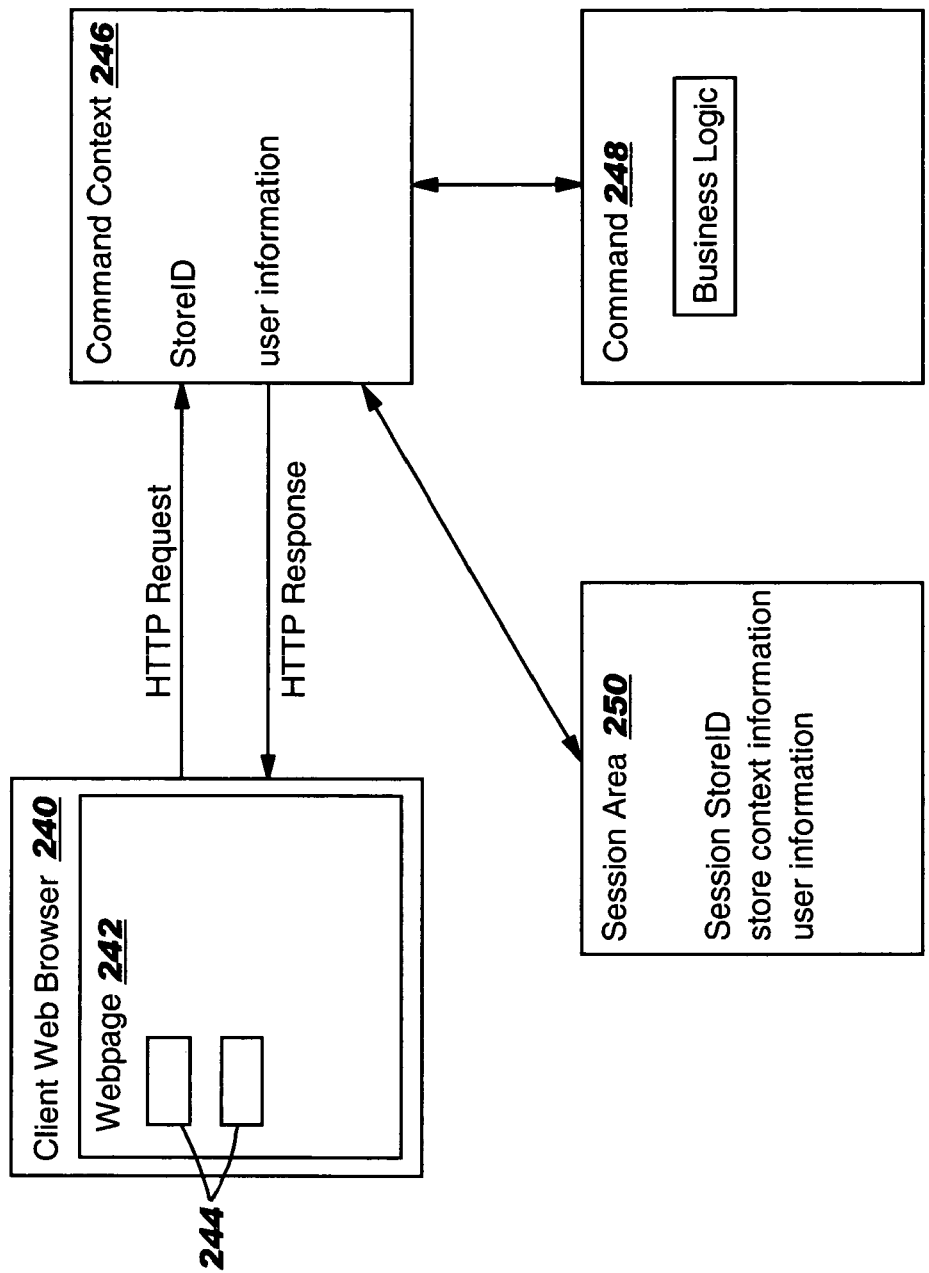
FIG. 6 is a schematic diagram of one embodiment of a commerce context switch implemented according to the present invention.

Reference is now made to FIG. 6, which shows a system implementation of a commerce context switch according to the present invention. A web browser 240 is used by a client in the e-marketplace 201 (FIG. 5). The browser 240 may be used to display a web page 242 in the e-marketplace 201 (FIG. 5) including buttons 244. The client may invoke an HTTP request using a command line invocation (not shown) in the browser 240 or by clicking on one of the buttons 244 using a mouse or similar pointing device. A typical HTTP request may take the form:

http://<path>/<requestname>?<querystring> where <path> is the URL, <requestname> are names which may identify, for example, a business logic object or command to be performed in respect of the request, and <querystring> is query script in which query parameters are typically separated by an "&".

Referring back to FIG. 5, in the e-marketplace 201, a buyer may navigate through a number of organizations or stores during a shopping flow. For example, the buyer may visit a direct or channel store 203 integrating a plurality of the supplier stores 206 and 212. The catalog 204 may be an aggregation of the product offerings of the hosted stores 206 and the remote stores 212. In this arrangement, some of supplier stores coupled to the direct store 203 may be hosted while other stores may be remotely located. Similarly, some of the supplier stores may be in a different domain from the channel store 203. Typically, each store will have its own commerce context, for example, a store context. A store may have its own business logic and its own operational data. Similarly, the user experience or "look and feel" of a store may be unique. For some stores, these and/or other aspects may be shared. A store context can contain information such as the store supported language, currency, directory for web assets such as store pages, and various store policies.

When navigating between stores, it is necessary to manage the switch between store contexts. Typically, the client will switch between a direct or channel store context and supplier store contexts, for example the direct store 203 and a supplier store 206 (FIG. 5). Usually, the client will return to the channel store after a transaction or event in a supplier store has been completed. For convenience, the channel store context is sometimes referred to as the direct store context, and the supplier store context is sometimes referred to as the temporary store context. Store context parameters are used to manage the switch between store contexts. Parameters StoreID and ForStoreID are used to identify the channel store context and supplier store context respectively. The channel store context saved in the session is the Session StoreID.

In a typical scenario, a client visits a channel store 203. The StoreID parameter is initially provided as a request parameter and stored in the session as the Session StoreID on return. The client then browses through other pages in the channel store 203 without specifying any StoreID parameters on the subsequent requests. The client may then visit a remote supplier store 212 in which case a ForStoreID parameter is used. When the client returns to the channel store 203 its StoreID is retrieved from the session and the proper store context is constructed. The command is aware of the StoreID but not its origin, e.g. whether the StoreID is derived from the request or the session area, or whether the StoreID refers to a direct store 203 or supplier store 206, 212. Similarly, the command does not know if a supplier store is a hosted store 206 or a non-hosted remote store 212, e.g. in a different domain than the channel store 203. This information is handled by the business logic 28 of the command using the StoreID.

Figure 7:
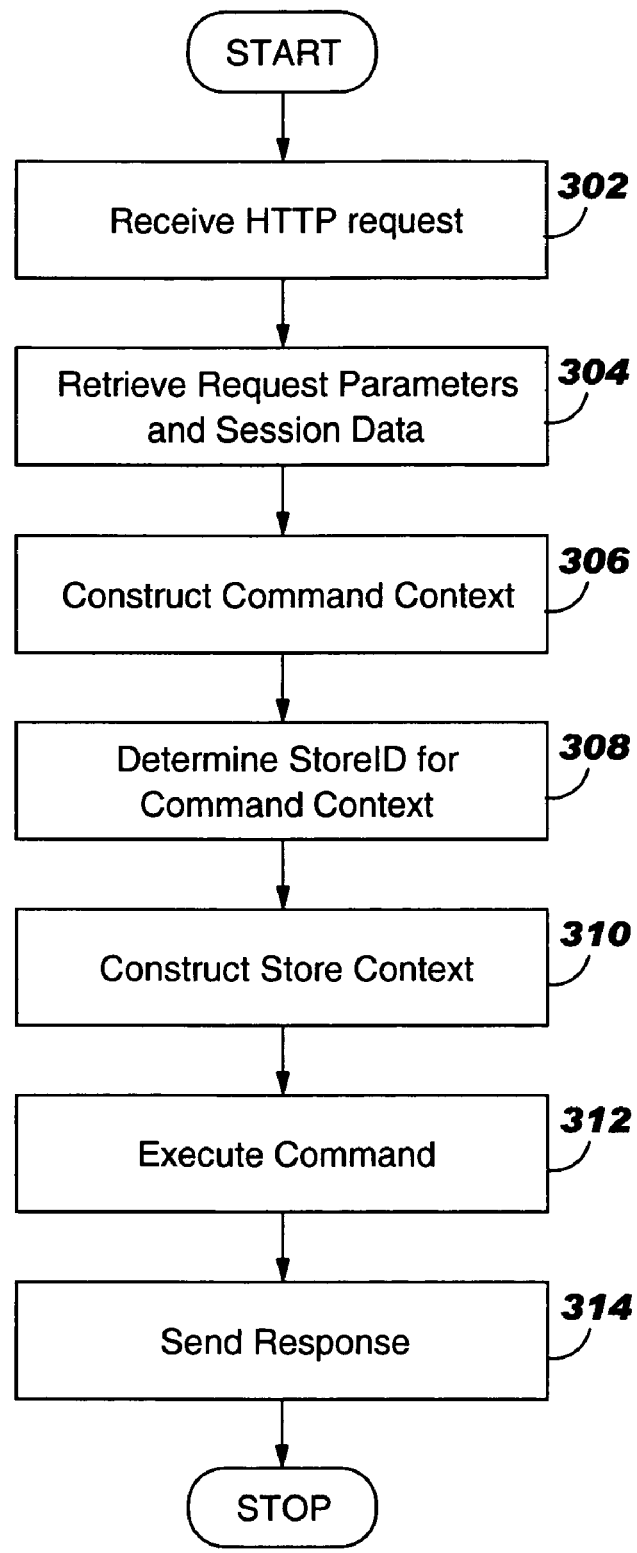
FIG. 7 is a flowchart showing the steps in the operation of the commerce context switch of FIG. 6.

Referring again to FIG. 6 and also the flowchart depicted in FIG. 7, the store context parameters are explained in more detail. When a client makes an HTTP request in the browser 240, the controller module 102 receives the request (step 302 in FIG. 7) and retrieves any request parameters and session information and data (step 304 in FIG. 7). The controller module 102 creates a command context 246 associated with the request (step 306 in FIG. 7). The command context 246 is created fresh for each request and does not maintain information across requests. In this manner, the command context 246 is stateless. A command 248 is associated with the client request and the command context 246. The command 248 represents the client request, for example, the requested business logic operation. The command context 246 contains the information required to execute the command 248 such as the StoreID. By way of example, a client may make the following HTTP request:

http://www.shoe.com/ProductDisplay?StoreID=203&ProductID=ABC where "StoreID" and "ProductID" are request parameters and "ProductDisplay" represents the business logic command that is called by the request.

The client request may contain one or more store context parameters, or no store context parameters. Table 1 shown below summarizes the combinations of store context parameters that may be included in the request. Using the request parameters and session information and data, the value of the StoreID to be stored in the command context 246 is determined (step 308 in FIG. 7).

A session area 250 provides a store for session data and information including store context information and the Session StoreID. The session area 250 persists across client requests. Session management is performed using cookies, however other session management strategies such as URL rewriting may be used so long as the implemented solution provides a session area 250. Depending on the session management solution adopted, the session area 250 may be located on the client device or the server.

The controller module 102 (FIG. 4) will construct a store context with the StoreID in the command context 246 (step 310 in FIG. 7). Typically, the command context 246 will also contain some user information such as preferences. Commands are used to implement business logic. The controller module 102 (FIG. 4) determines the command to execute based on the request name. Optionally, it can be based on the StoreID in the command context because we can have different business policies for different store. Next the command 248 will execute using the command context and the associated store context (step 312 in FIG. 7). Using the command result, a response is sent to the web browser 240 by the controller module 102 (step 314 in FIG. 7). In the case where the ForStoreID request parameter is present, following execution of the command, the application 101 has the option of passing the command context 246 to the view module 106 in its present state or changing the StoreID to the new session StoreID before passing it to the view. In the first case, the view will be displayed in the context of the ForStoreID of the supplier store. In the second case, the view will be presented in the context of the channel store. It should be noted that the framework of the present embodiment requires a store context parameter to be included in either the client request or the session area 250. If the session area 250 does not contain a Session StoreID and the client request does not include a StoreID or ForStoreID, the client request will fail and the client will be sent an HTTP error status page.

TABLE 1

Store Context Construction

| ForStoreID parameter in request | StoreID parameter in request | StoreID in Session | Store context used in the command context | Session StoreID at the end of the request |
|---|---|---|---|---|
| X | | | ForStoreID | |
| X | X | | ForStoreID | StoreID |
| | X | | StoreID | StoreID |
| | X | X | StoreID | StoreID |
| | | X | Session StoreID | Session StoreID |
| X | | X | ForStoreID | Session StoreID |
| X | X | X | ForStoreID | StoreID |

Figure 8:
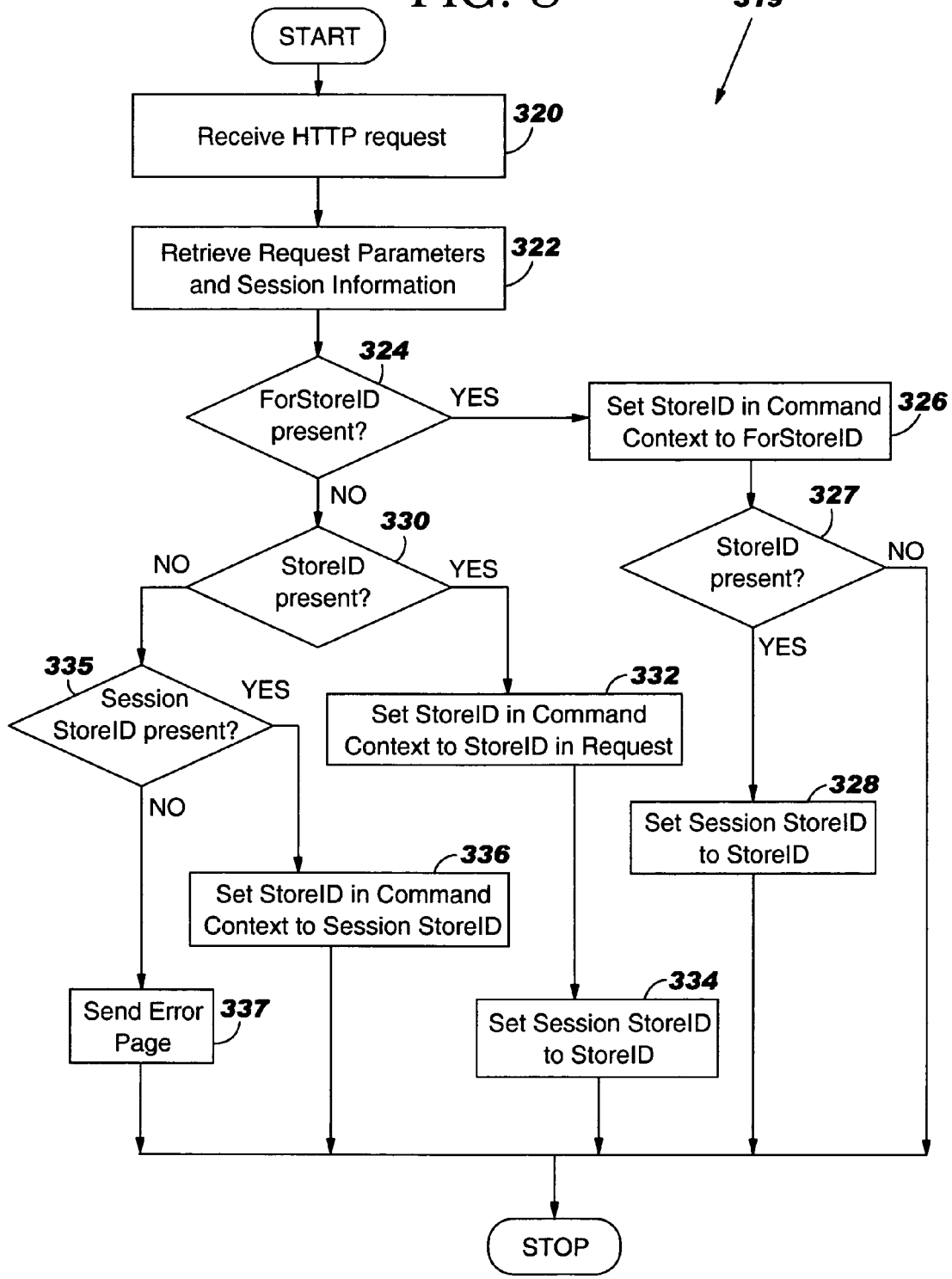
FIG. 8 is a flowchart showing a process for handling commerce context parameters by the commerce context switch of FIG. 6.

Referring now to FIG. 8, a process 319 for handling of the store context parameters is described in more detail. In a first step 320, the controller module 102 (FIG. 4) receives an HTTP request. The controller module 102 (FIG. 4) operates using Java servlets. The controller module 102 (FIG. 4) then retrieves the request parameters and session data (step 322). If the request contains a ForStoreID parameter (decision block 324), the controller module 102 (FIG. 4) stores the ForStoreID parameter as the StoreID in the command context 246 (FIG. 6) (step 326). If a StoreID parameter is also present (decision block 327), the Session StoreID will be set to the StoreID in the request (step 328). If no StoreID parameter is present, the Session StoreID will remain unchanged.

If no ForStoreID is present (decision block 324), the controller module 102 (FIG. 4) determines if a StoreID is present (decision block 330). If a StoreID parameter is present, the controller module 102 (FIG. 4) stores the StoreID in the request as the StoreID in the command context 246 (step 332). Next, the controller module 102 (FIG. 4) stores the StoreID as the Session StoreID in the session area 250 (step 334).

If no StoreID is present (decision block 330), the controller module 102 (FIG. 4) stores the Session StoreID as the StoreID in the command context 246 (step 336). If no Session StoreID is present (decision block 335), this will be an error situation and the client will be sent an HTTP error status page (step 337).

Figure 9:
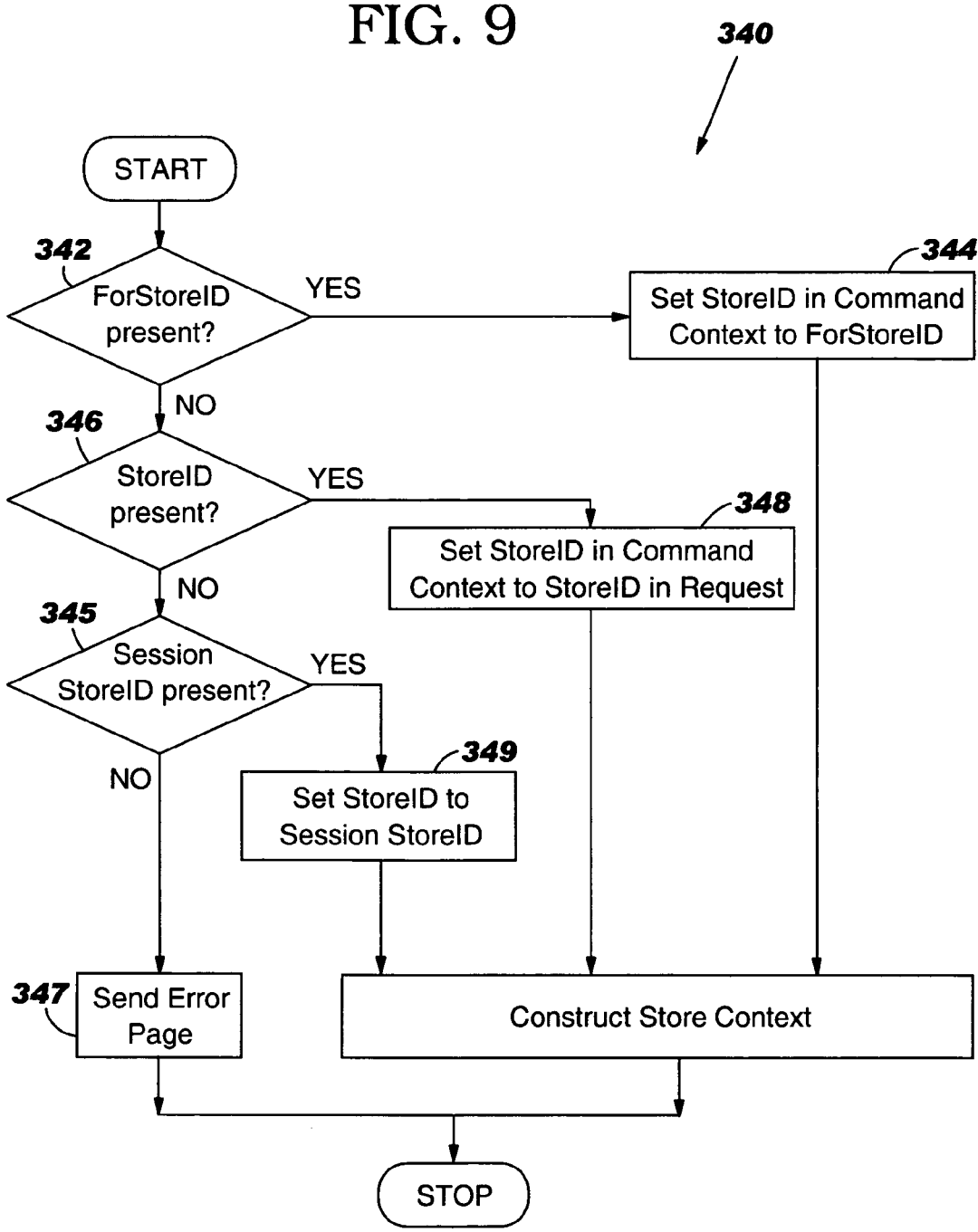
FIG. 9 is a flowchart of the procedure for determining the commerce context at the end of a client request.

Referring now to FIG. 9, a procedure 340 for determining the store context for the command context 246 is described in more detail. If the client request contains a ForStoreID parameter (decision block 342), the controller module 102 (FIG. 4) stores the ForStoreID parameter as the StoreID in the command context 246 (step 344). In this case, the store context constructed is that of a supplier store.

If no ForStoreID is present (decision block 342), the controller module 102 (FIG. 4) then determines if a StoreID is present (decision block 346). If a StoreID parameter is present, the controller module 102 (FIG. 4) stores the StoreID in the request in the command context 246 (step 348). The store context is constructed based on the StoreID request parameter. If no StoreID parameter is present (decision block 346) but a Session StoreID is present, the controller modules 102 (FIG. 4) stores the Session StoreID in the command context 246 (step 349) and the store context is constructed based on the Session StoreID. If no Session StoreID is present (decision block 345), this will be an error situation and the client will be sent an HTTP error status page (step 347).

Figure 10:
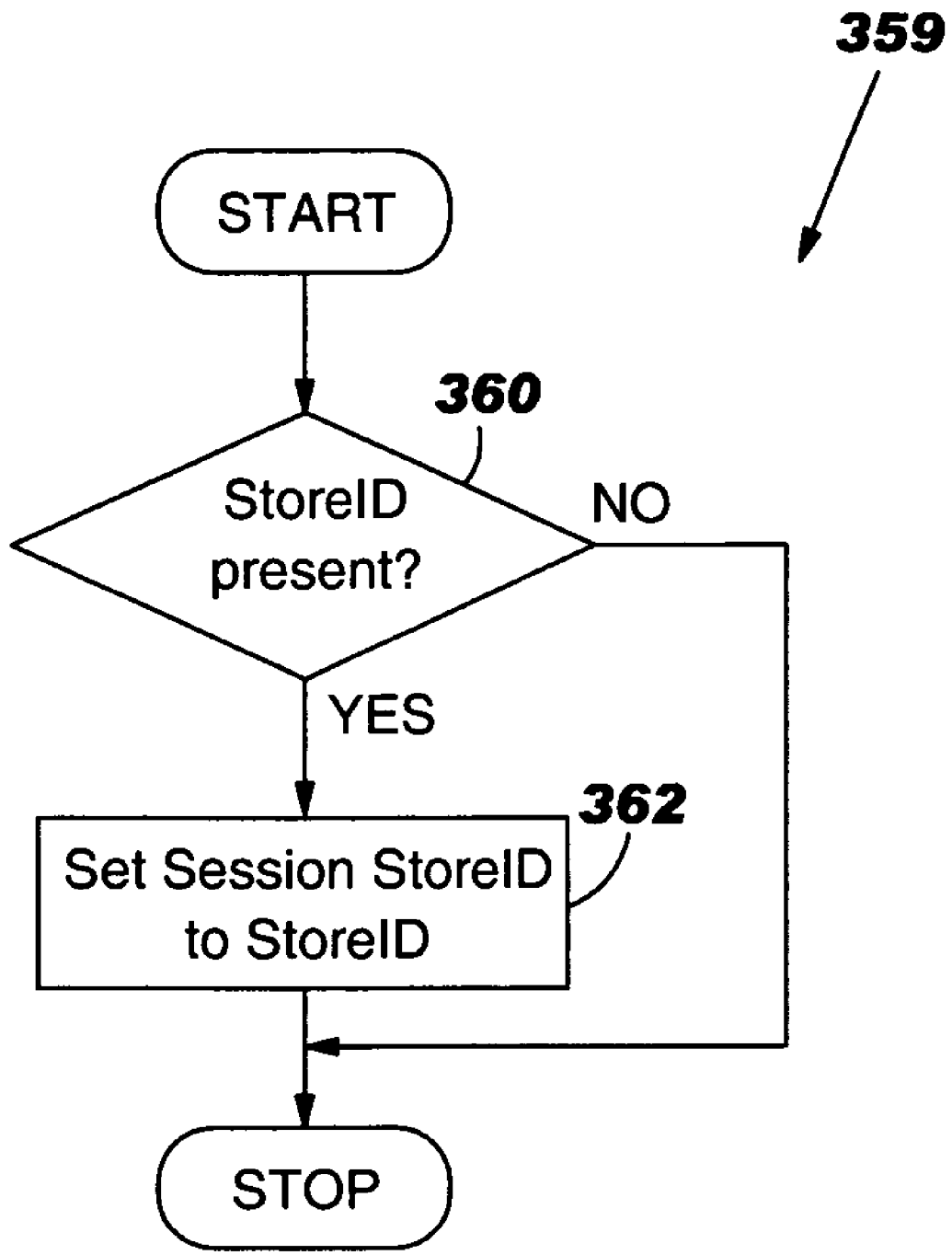
FIG. 10 is a flowchart of the procedure for determining the commerce context in the session area at the end of a client request.

Referring now to FIG. 10, a procedure 359 for determining the store context in the session area 250 at the end of the request will be explained in more detail. If a StoreID parameter is present in the client request (decision block 360), the Session StoreID will be changed to the StoreID at the end of the request processing (step 362). If no StoreID is present in the request, the Session StoreID at the end of the request processing will be the Session StoreID currently in the session area 250.

Figure 11:
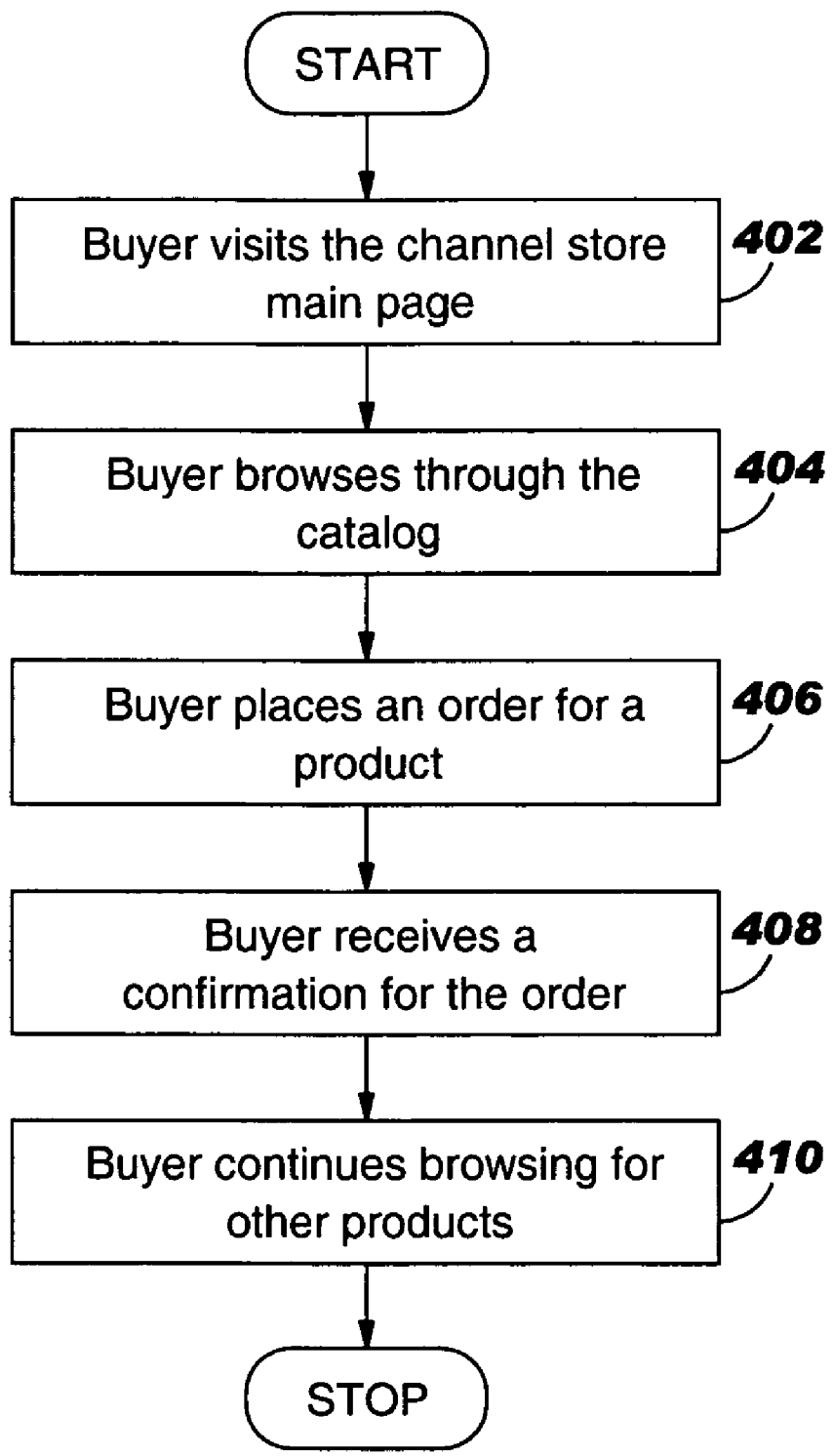
FIG. 11 is a flowchart of a shopping scenario.

Reference is next made to FIG. 11, which illustrates the steps for an exemplary shopping scenario in the e-marketplace 201 in accordance with the present invention. As in many online stores, clients are provided with a browseable product catalog 204 (FIG. 5) from which items can be viewed. In this example, the client has opened a new session in the web browser 240 (FIG. 6). In a first step 402, the buyer visits the main page of a channel store 203 integrating a plurality of supplier stores which may be located locally or remotely. The URL for this action may appear as follows:

http://www.onlinestores.com/StoreFrontDisplay?StoreID=203

Because this is a new session, there is no StoreID in the session area 250 (FIG. 6). The controller module 102 (FIG. 4) retrieves the StoreID parameter from the request and stores it in the command context 246 (FIG. 6). The store context is then constructed based on the StoreID and the StoreFrontDisplay command is executed. The resultant storefront view is generated and sent to the web browser 240 (FIG. 6). The Session StoreID is then set to the StoreID. The Session StoreID is now a persistent global variable available in the session.

The buyer may then browse the catalog 204 (FIG. 5) for products to order. Next in step 404, the buyer selects a product to be displayed. The URL for this action may appear as follows:

http://www.onlinestores.com/ProductDisplay?ProductID=ABC1 where ProductID is a parameter identifying a product. The controller module 102 (FIG. 4) retrieves the ProductID parameter from the request. The client request does not include a StoreID so the controller module 102 (FIG. 4) retrieves the Session StoreID from the session area 250 (FIG. 6) and stores it as the StoreID in the command context 246 (FIG. 6). The store context is then constructed using the StoreID and the ProductDisplay command is executed. The resultant product display view is then generated and sent to the web browser 240 (FIG. 6).

Next in step 406, the buyer chooses to order the product "ABC1". This product belongs to supplier store "20". The URL for this action may appear as follows:

http://www.onlinestores.com/OrderProcess?ForStoreID=20&ProductID=ABC1

In this case, a ForStoreID is present so the OrderProcess command will be executed in a supplier store context rather than the channel store context. The controller module 102 (FIG. 4) retrieves the ForStoreID parameter from the request and stores it as the StoreID in the command context 246 (FIG. 6). The store context is then constructed using the StoreID and the OrderProcess command is executed. The resultant view is then generated and sent to the web browser 240 (FIG. 6).

Next in step 408, an order confirmation is displayed. The URL for this action may appear as follows:

http://www.onlinestores.com/OrderDisplay?ForStoreID=20&ProductID=ABC1

The controller module 102 (FIG. 4) retrieves the ForStoreID parameter from the request and stores it as the StoreID in the command context 246 (FIG. 6). The store context is then constructed using the StoreID and the OrderDisplay command is executed. The resultant view is then generated and sent to the web browser 240 (FIG. 6).

Next in step 410, the buyer is returned to browsing in the catalog 204 (FIG. 5). The URL for this action may appear as follows:

http://www.onlinestores.com/ProductDisplay?ProductID=ABC1

The controller module 102 (FIG. 4) retrieves the ProductID parameter from the request. Because there is no store context parameter specified in the request, the controller module 102 (FIG. 4) retrieves the Session StoreID from the session area 250 (FIG. 6) and stores it as the StoreID in the command context 246 (FIG. 6). The store context is then constructed using the Session StoreID and the ProductDisplay command is executed. The resultant product display view is then generated and sent to the web browser 240 (FIG. 6).

It will be appreciated by one of ordinary skill in the art that application frameworks different from that described above may be used without departing from the scope of the present invention. For example, in another framework, a login operation may be performed prior to the StoreFrontDisplay operation. This login operation may store the StoreID parameter in the session area 250 prior to the step of displaying the requested storefront. Allowance for variation in the framework permits more customizable application design. For example, after the completion of an event, designers may choose to display an order confirmation which, may be performed in the supplier store or channel store, or the client may be returned to browsing the catalog in the channel store. Also, depending on the application framework implemented, some command parameters, for example the view parameters, may be included in the HTTP request or hard coded into the business logic of the command. It will also be appreciated by one of ordinary skill in the art that the method of managing store contexts provided by the present invention may be used for other e-marketplace operations, for example, a request for quotations (RFQ). Further, the present invention may be used to manage other commerce information that requires a temporary switch such as locale, language or currency information.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. For a data processing system, a method for managing commerce contexts, the data processing system being associated with a direct commerce context and a temporary commerce context, the data processing system being operatively coupled to memory having a session area, said method comprising the steps of:
receiving a client request associated with a commerce context parameter;
determining the commerce context associated with said commerce context parameter; and
constructing the commerce context associated with said commerce context parameter, wherein said client request further includes a second commerce context parameter, and wherein said method further comprises the step of defining said second commerce context parameter in the session area.

2. The method as claimed in claim 1, wherein the step of determining the commerce context associated with said commerce context parameter includes determining whether said commerce context parameter identifies said direct commerce context or said temporary commerce context.

3. The method as claimed in claim 1, wherein said commerce context parameter is included in said client request.

4. The method as claimed in claim 1, wherein said commerce context parameter is defined in the session area.

5. The method as claimed in claim 1, further comprising the step of executing said client request using said constructed commerce context.

* * * * *